United States Patent
Yamaoka

(10) Patent No.: US 9,722,662 B2
(45) Date of Patent: Aug. 1, 2017

(54) SEMICONDUCTOR DEVICE AND SERIAL DATA TRANSMISSION LINE SYSTEM

(71) Applicant: Renesas Electronics Corporation, Kawasaki-shi (JP)

(72) Inventor: Toshifumi Yamaoka, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 293 days.

(21) Appl. No.: 14/574,152

(22) Filed: Dec. 17, 2014

(65) Prior Publication Data
US 2015/0180535 A1 Jun. 25, 2015

(30) Foreign Application Priority Data
Dec. 24, 2013 (JP) .................. 2013-265661

(51) Int. Cl.
*H04B 3/14* (2006.01)
*H02M 1/00* (2006.01)
*G06F 1/26* (2006.01)

(52) U.S. Cl.
CPC ............ *H04B 3/145* (2013.01); *G06F 1/26* (2013.01); *H02M 2001/0045* (2013.01)

(58) Field of Classification Search
CPC .......... H04B 3/00; H04B 3/141; H04B 3/145; G06F 1/26; G06F 1/263; G06F 1/266; H02M 2001/0029; H02M 2001/0045

USPC ....... 375/229, 232, 257, 316, 324, 328, 340, 375/346
See application file for complete search history.

(56) References Cited

U.S. PATENT DOCUMENTS 5,283,531 A * 2/1994 Serizawa .............. H04L 1/0001
329/316
2010/0079216 A1 4/2010 Sakano

FOREIGN PATENT DOCUMENTS

JP 2005-191750 A 7/2005
JP 2010-103974 A 5/2010

* cited by examiner

*Primary Examiner* — Siu Lee
(74) *Attorney, Agent, or Firm* — McGinn IP Law Group, PLLC

(57) ABSTRACT

A semiconductor device and a serial data transmission line system have a reception circuit and an adaptive equalizer circuit. A supply source of a power supply supplied with the reception circuit is selected based on correction intensity of the correction value calculated by the adaptive equalizer circuit. When correction intensity of the correction value calculated by the adaptive equalizer circuit is not less than a threshold value, the supply source of the power supply supplied to the reception circuit and the adaptive equalizer circuit is switched, and a noise level of the power supply is reduced.

16 Claims, 7 Drawing Sheets

SEMICONDUCTOR DEVICE AND SERIAL DATA TRANSMISSION LINE SYSTEM

CROSS-REFERENCE TO RELATED APPLICATIONS

This application claims priority based on Japanese Patent Application No. 2013-265661 filed on Dec. 24, 2013, and the entire disclosure thereof is incorporated herein.

BACKGROUND

The present invention relates to a semiconductor device and a serial data transmission line system and, for example, to a semiconductor device and a serial data transmission line system that relay transmission of serial data.

In recent years, high-speed serial communication that transmits high-speed serial data has been often used for data communication between devices. In this high-speed serial communication, deterioration of signal quality due to loss of a transmission line is largely concerned with communication quality. Consequently, as one of the methods that improve the communication quality, the following has been performed: characteristic change of the transmission line is detected using an adaptive equalizer circuit, and a correction value (for example, an equalizer coefficient) is dynamically adjusted so as to be able to receive data in a most suitable state.

Consequently, examples of the adaptive equalizer circuit are disclosed in Japanese Unexamined Patent Application Publication No. 2010-103974 and Japanese Unexamined Patent Application Publication No. 2005-191750. Japanese Unexamined Patent Application Publication No. 2010-103974 discloses a circuit configuration of the adaptive equalizer circuit.

In addition, in Japanese Unexamined Patent Application Publication No. 2005-191750, a technology of restarting a power supply when an error rate of an equalized signal obtained through an equalization unit exceeds a threshold value in a communication device having the equalization unit (for example, an equalizer circuit),is disclosed.

However, in order to improve a transmission speed of a signal in recent high-speed serial communication, a circuit is configured with a transistor formed in a fine process. The transistor formed in this fine process has a low breakdown withstand voltage, has a large voltage difference with respect to a voltage of an external power supply provided from outside, and needs to be made to operate with a power supply voltage lower than the voltage of the external power supply. Therefore, in a circuit utilized in the high-speed serial communication, an influence that a power supply noise has on signal quality is large, and there is a problem of being unable to obtain sufficient communication quality only by improvement of the signal quality by means of the adaptive equalizer circuit.

Other problems to be overcome by the present invention and new features thereof will be apparent from the description of the specification and accompanying drawings.

SUMMARY

According to one embodiment, a semiconductor device and a serial data transmission line system have a reception circuit and an adaptive equalizer circuit, and when a correction intensity of a correction value calculated by the adaptive equalizer circuit is not less than a threshold value, a supply source of a power source supplied to the reception circuit and the adaptive equalizer circuit is switched, and thus a noise level of the power supply is reduced.

It is to be noted that a method and a system that have been replaced and represented from the device of the above-described embodiment, a program that makes a computer execute processing of the device or partial processing thereof, etc. are also effective as aspects of the present invention.

According to the semiconductor device and the serial data transmission line system pertaining to the one embodiment, communication quality can be improved.

DETAILED DESCRIPTION

Figure 1:
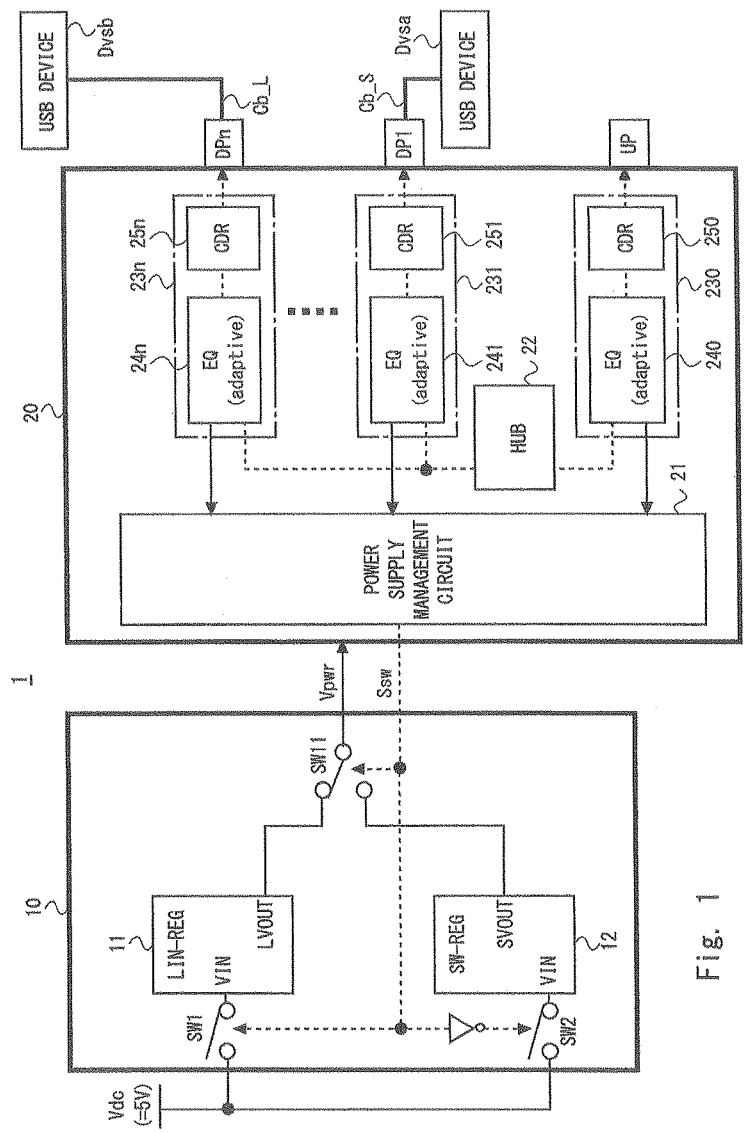
FIG. 1 is a block diagram of a serial data transmission line system pertaining to an embodiment 1.

Hereinafter, embodiments will be explained with reference to drawings. Here, in the following explanation, the following description and drawings are sometimes appropriately omitted and simplified for clarity of explanation. In addition, components described in the drawings as functional blocks that perform various processing can each be configured with a CPU, a memory, and other circuits as hardware, and the components are achieved by a program loaded in the memory, etc. as software. Accordingly, it is to be understood by those skilled in the art that these functional blocks can be achieved in various forms only by hardware, only by software, or by a combination thereof, and the present invention is not limited to any of these. It is to be noted that in each drawing, the same symbols are attached to the same components, and that overlapping explanations are omitted if needed.

In addition, the above-mentioned program is stored using various types of non-transitory computer readable media, and can be supplied to a computer. The non-transitory computer readable medium includes various types of tangible storage media. Examples of the non-transitory computer readable medium include: a magnetic recording medium (for example, a flexible disk, a magnetic tape, a hard disk drive); a magneto-optical recording medium (for example, a magneto-optical disk); a CD-ROM (Read Only Memory); a CD-R; a CD-R/W; and a semiconductor memory (for example, a mask ROM, a PROM (Programmable ROM), an EPROM (Erasable PROM), a flash ROM, a RAM (Random Access Memory)). In addition, the program may be supplied to the computer by various types of transitory computer readable media. Examples of the transitory computer readable medium include an electrical signal, an optical signal, and an electromagnetic wave. The transitory computer readable medium can supply the program to the computer through a wired communication channel, such as an electric wire and an optical fiber, or a radio communication channel.

Embodiment 1

First, FIG. 1 is a block diagram of a serial data transmission line system 1 pertaining to an embodiment 1. As shown in FIG. 1, the serial data transmission line system 1 pertaining to the embodiment 1 is a USB hub that connects USE (Universal Serial Bus) devices. However, a technology explained in the following embodiment can be applied to a device that transmits and receives serial data in SATA (Serial Advanced Technology Attachment), a wired LAN (Local Area Network), etc.

That is, the technology explained in the embodiment is not limited to the USB hub.

The serial data transmission line system 1 shown in FIG. 1 has a power supply generation circuit 10 and a data relay hub device 20. The power supply generation circuit 10 generates an operation power supply Vpwr (for example, a DC voltage of approximately 1 V) supplied to the data relay hub device 20 from an external power supply Vdc (for example, a DC voltage of 5 V). Although the power supply generation circuit 10 is provided as one device in FIG. 1, each circuit block in the power supply generation circuit 10 may be respectively mounted as an individual element or circuit element.

The data relay hub device 20 is a semiconductor device in which a circuit that achieves a hub function to relay serial data is formed on one semiconductor substrate (hereinafter referred to as one chip). The data relay hub device 20 has an upstream port UP, and a plurality of downstream ports (n downstream ports DP are shown in FIG. 1. In the following explanation, n is used as a number of the port.). Additionally, the data relay hub device 20 relays transmission and reception of data between a device that is connected to the upstream port and USB devices Dvsa and Dvsb that are connected to the downstream ports.

In addition, in FIG. 1, an example is shown where the USE device Dvsa is connected to a downstream port DP1 through a cable Cb_S, and where the USB device Dvsb is connected to a downstream port DPn through a cable Cb_L. The cable Cb_S is shorter than the cable Cb_L. As mentioned later in detail, a signal loss in a cable generally becomes large when the cable is long, and thus a correction value generated by an equalizer circuit of the data relay hub device 20 becomes large. In addition, a PC (Personal Computer)) is connected to the upstream port UP through a cable, although an illustration of such a host device is omitted in FIG. 1.

Here, the power supply generation circuit 10 and the data relay hub device 20 will be explained more specifically. As shown in FIG. 1, the power supply generation circuit 10 has: a second power supply circuit (for example, a linear regulator 11); a first power supply circuit (a switching regulator 12); and switch circuits SW1, SW2, and SW11. In the following explanation, the switch circuit SW11 is particularly referred to as a power supply selection switch circuit SW11.

When the switch circuit SW1 is in an on state, the linear regulator 11 generates a second power supply (for example, a step-down power supply LVOUT) from the external power supply Vdc. When the switch circuit SW2 is in an on state, the switching regulator 12 generates a first power supply (for example, a step-down power supply SVOUT) from the external power supply Vdc. The on state and an off state of the switch circuits SW1 and SW2 are switched by a power supply selection signal Ssw output by the data relay hub device 20. In addition, the power supply selection signal Ssw is transmitted to the switch circuit SW2 through an inverter. That is, the on state and the off state of the switch circuits SW1 and SW2 are exclusively switched.

The power supply selection switch circuit SW11 selects either one of the step-down power supply SVOUT generated by the switching regulator 12 and the step-down power supply LVOUT generated by the linear regulator 11 based on the power supply selection signal Ssw, and provides the selected power supply at least to a reception circuit and the equalizer circuit as the operation power supply Vpwr. The reception circuit and the equalizer circuit are circuit blocks mounted in the data relay hub device 20, and details thereof will be mentioned later.

Here, differences between the linear regulator 11 and the switching regulator 12 will be explained. The linear regulator 11, for example, has: an error amplifier; an output transistor; and a gain setting resistor group. The linear regulator 11 drives the output transistor by an output signal of the error amplifier. In addition, the output transistor and the gain setting resistor group are connected in series between the external power supply Vdc that supplies an input voltage and a ground power supply. Additionally, the linear regulator 11 amplifies by the error amplifier a voltage difference between a feedback voltage output from a tap provided in the gain setting resistor group and a reference voltage generated separately, and drives the output transistor by the output signal output by the error amplifier. As a result, the linear regulator 11 outputs the step-down power supply LVOUT from a connection point of the output transistor and the gain setting resistor group.

Meanwhile, the switching regulator 12, for example, has: an error amplifier; a PWM signal generation circuit; an output transistor; and a smoothing circuit. The switching regulator 12 amplifies by the error amplifier an error between a voltage of the step-down power supply SVOUT and a reference voltage generated separately, and provides the error to the PWM signal generation circuit. The PWM signal generation circuit then varies a duty ratio of a PWM signal according to an output voltage of the error amplifier, and drives the output transistor by the PWM signal. After that, the switching regulator 12 smooths a pulse signal generated by on/off of the output transistor in the smoothing circuit, and generates the step-down power supply SVOUT.

From the above-described explanation, it is seen that the step-down power supply LVOUT output by the linear regulator 11 is generated by controlling activity of the output transistor by means of the output signal of the error amplifier. Meanwhile, the step-down power supply SVOUT output by the switching regulator 12 is generated by smoothing the pulse signal caused by switching of on/off of the output transistor. Therefore, the step-down power supply LVOUT output by the linear regulator 11 has a noise level smaller than that of the step-down power supply SVOUT output by the switching regulator 12. In addition, in the power supply generation circuit 10, the power supply selection switch circuit SW11 switches a signal used as the operation power supply Vpwr from the step-down power supply LVOUT to the step-down power supply SVOUT according to the power supply selection signal Ssw, and thereby the noise level of the operation power supply Vpwr is reduced.

In addition, since the linear regulator 11 continuously varies the activity of the output transistor, a voltage difference between a source and a drain is always large during operation. Meanwhile, the switching regulator 12 controls an output voltage by adjusting a ratio of an on-state time and an off-state time of the output transistor. Therefore, the linear regulator 11 has a disadvantage in that loss in the output transistor is larger and power consumption becomes larger as compared with those of the switching regulator 12. Therefore, in the serial data transmission line system 1, supply of the operation power supply Vpwr to the data relay hub device 20 is performed by the switching regulator 12 as Much as possible, whereby power consumption of the system is reduced, and supply of the operation power supply Vpwr to the data relay hub device 20 by the linear regulator 11 is performed only when an improvement in signal quality is determined to be needed.

Next, the data relay hub device 20 will be explained. As shown in FIG. 1, the data relay hub device 20 has: a power supply management circuit 21; a hub 22; and reception blocks 230 to 23n. It is to be noted that although the data relay hub device 20 has a transmission block including a transmission circuit, it is omitted in FIG. 1. In addition, the reception blocks 230 to 23n each respectively have an equalizer circuit and a reception circuit (for example, a clock data recovery circuit). In FIG. 1, the reception block 230 includes an equalizer circuit 240 and a clock data recovery circuit 250, the reception block 231 includes an equalizer circuit 241 and a clock data recovery circuit 251, and the reception block 23n includes an equalizer circuit 24n and a clock data recovery circuit 25n.

The clock data recovery circuits 250 to 25n operate based on the operation power supply Vpwr. The clock data recovery circuits 250 to 25n reproduce clock signals from serial data obtained through reception ports.

The equalizer circuits 240 to 24n operate based on the operation power supply Vpwr. The equalizer circuits 240 to 24n reproduce reception data from the serial data using the clock signals reproduced by the clock data recovery circuits 250 to 25n. In addition, the equalizer circuits 240 to 24n are adaptive type equalizer circuits, and they calculate correction values according to distortion amounts of the reception signals, and reproduce the reception data after correcting the reception signals using the correction values. Furthermore, the equalizer circuits 240 to 24n output the generated correction values to the power supply management circuit 21.

In addition, the equalizer circuits 240 to 24n respectively generate a correction value when another device (for example, a USB device) is connected to input terminals of the clock data recovery circuits 250 to 25n, and when the USB device is disconnected, respectively output a disconnection notice signal that notifies the power supply management circuit 21 that the USB device has been disconnected.

The hub 22 distributes data output from the reception block 230 into transmission circuits provided so as to correspond to the reception blocks 231 to 23n. In addition, the hub 22 performs arbitration processing of the data provided from the reception blocks 231 to 23n, and outputs to a transmission circuit provided so as to correspond to the reception block 230 the data output from the reception blocks 231 to 23n.

The power supply management circuit 21 outputs the power supply selection signal Ssw according to the correction values output by the equalizer circuits 240 to 24n. More specifically, when the correction value is not less than a preset threshold value, the power supply management circuit 21 instructs the power supply generation circuit 10 to output the second power supply (for example, the step-down power supply LVOUT) as the operation power supply Vpwr by the power supply selection signal Ssw. In the embodiment 1, in the data relay hub device 20, the power supply management circuit 21, the hub 22, and the reception blocks 230 to 23n all operate by the operation power supply Vpwr.

In addition, when at least one correction value not less than the threshold value is included in the correction values output by the equalizer circuits 240 to 24n, the power supply management circuit 21 outputs the power supply selection signal Ssw that instructs that the noise level of the operation power supply Vpwr should be reduced. More specifically, the power supply management circuit 21 determines presence/absence of the reception blocks 230 to 23n in which the correction values are not less than the threshold value in response to the disconnection notice signals that are transmitted from the equalizer circuits 240 to 24n. If it is then determined that the reception blocks in which the correction values are not less than the threshold value are not present, the power supply management circuit 21 cancels the instruction to reduce the noise level of the operation power supply Vpwr, which instruction had been given to the power supply generation circuit 10 by the power supply selection signal Ssw.

When the power supply selection signal Ssw instructs that the noise level (for example, a high level) be reduced, the power supply generation circuit 10 puts the switch circuit SW1 in the on state, the switch circuit SW2 in the off state, and the power supply selection switch circuit SW11 in a state in which it is connected to the linear regulator 11 side, and generates the operation power supply Vpwr by the linear regulator 11. When the power supply selection signal Ssw cancels the reduction of the noise level (for example, a low level), the power supply generation circuit 10 puts the switch circuit SW1 in the off state, the switch circuit SW2 in the on state, and the power supply selection switch circuit SW11 in a state in which it is connected to the switching regulator 12 side, and generates the operation power supply Vpwr by the switching regulator 12.

Figure 2:
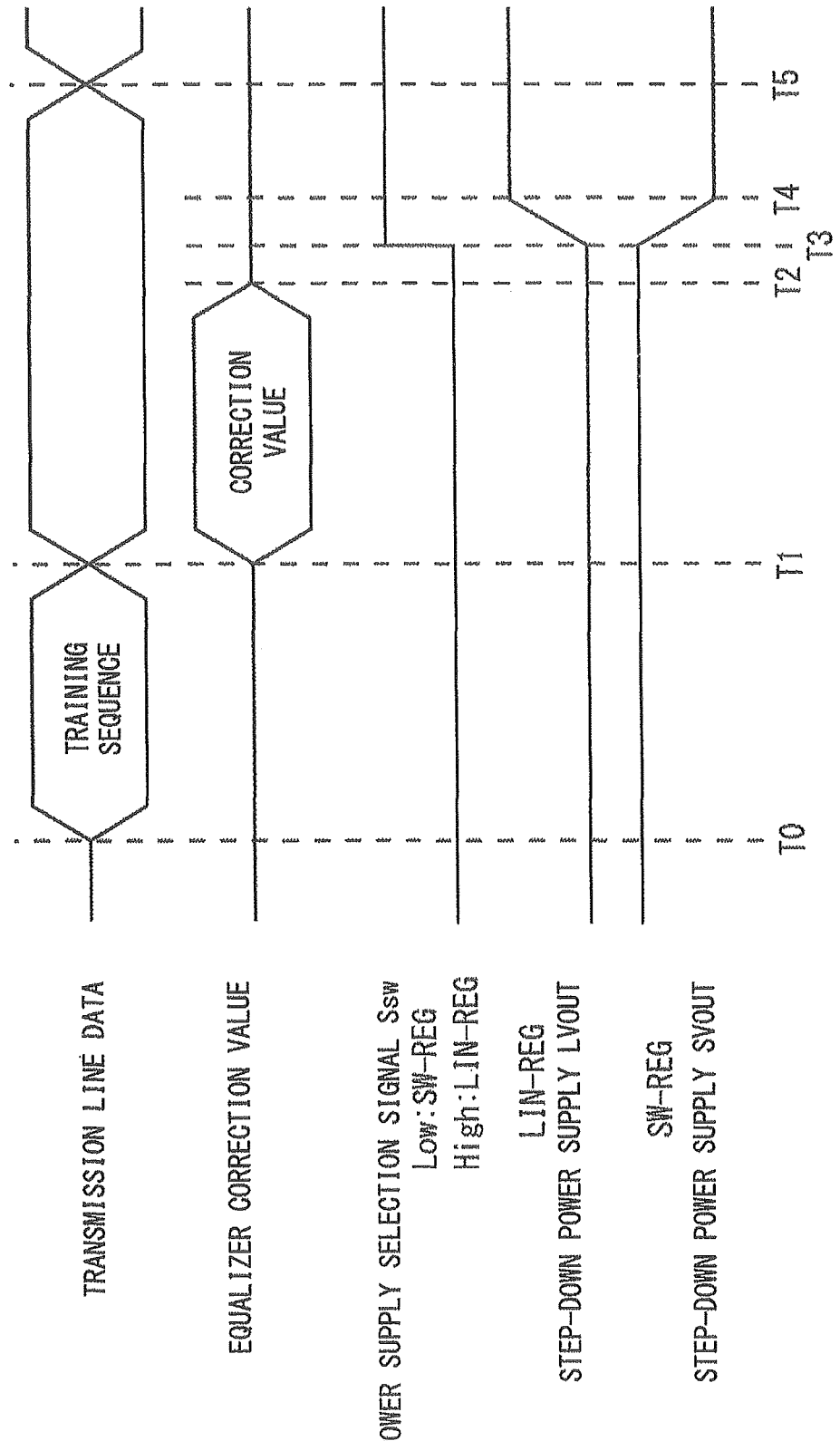
FIG. 2 is a timing chart showing operation of a semiconductor device pertaining to the embodiment 1.

Next, operation of the serial data transmission line system 1 pertaining to the embodiment 1 will be explained. First, an operation in which the equalizer circuits 240 to 24n generate correction values will be explained. FIG. 2 is a timing chart showing operation of a semiconductor device (for example, the data relay hub device 20) pertaining to the embodiment 1.

In an example shown in FIG. 2, a cable is connected to the downstream port of the data relay hub device 20 at a timing T0. The data relay hub device 20 starts a training sequence in response to this connection of the cable. In this training sequence, a training signal is transmitted and received to/from the USB device connected to the data relay hub device 20. The equalizer circuit of the data relay hub device 20 then decides a correction value at a timing T1 by an operation in the training sequence. The equalizer circuit then outputs the correction value to the power supply management circuit 21 at a timing T2. After that, if the correction value is not less than the threshold value, the power supply management circuit 21 switches the power supply selection signal Ssw from the low level to the high level at a timing T3. It is to be noted that the power supply selection signal Ssw instructs that the operation power supply Vpwr be generated by the switching regulator 12 during a low-level period, and instructs that the operation power supply Vpwr be generated by the linear regulator 11 during a high-level period.

In response to switching of a logical level of the power supply selection signal Ssw of this timing T3, the switch circuit SW1 becomes in the on state, the switch circuit SW2 becomes in the off state, and the power supply selection switch circuit SW11 is connected to the linear regulator 11 side. As a result, the linear regulator 11 starts operation, and the switching regulator 12 stops operation. The output of the linear regulator 11 then becomes in a stable state at a timing T4. After that, data transmission and reception between the data relay hub device 20 and the USB device are started from a timing T5.

As described above, in the data relay hub device 20, a correction value is generated using the equalizer circuit whenever a cable is connected to the downstream port. As a result, a most suitable correction value can be calculated for each connected cable and USB device in the data relay hub device 20.

Figure 3:
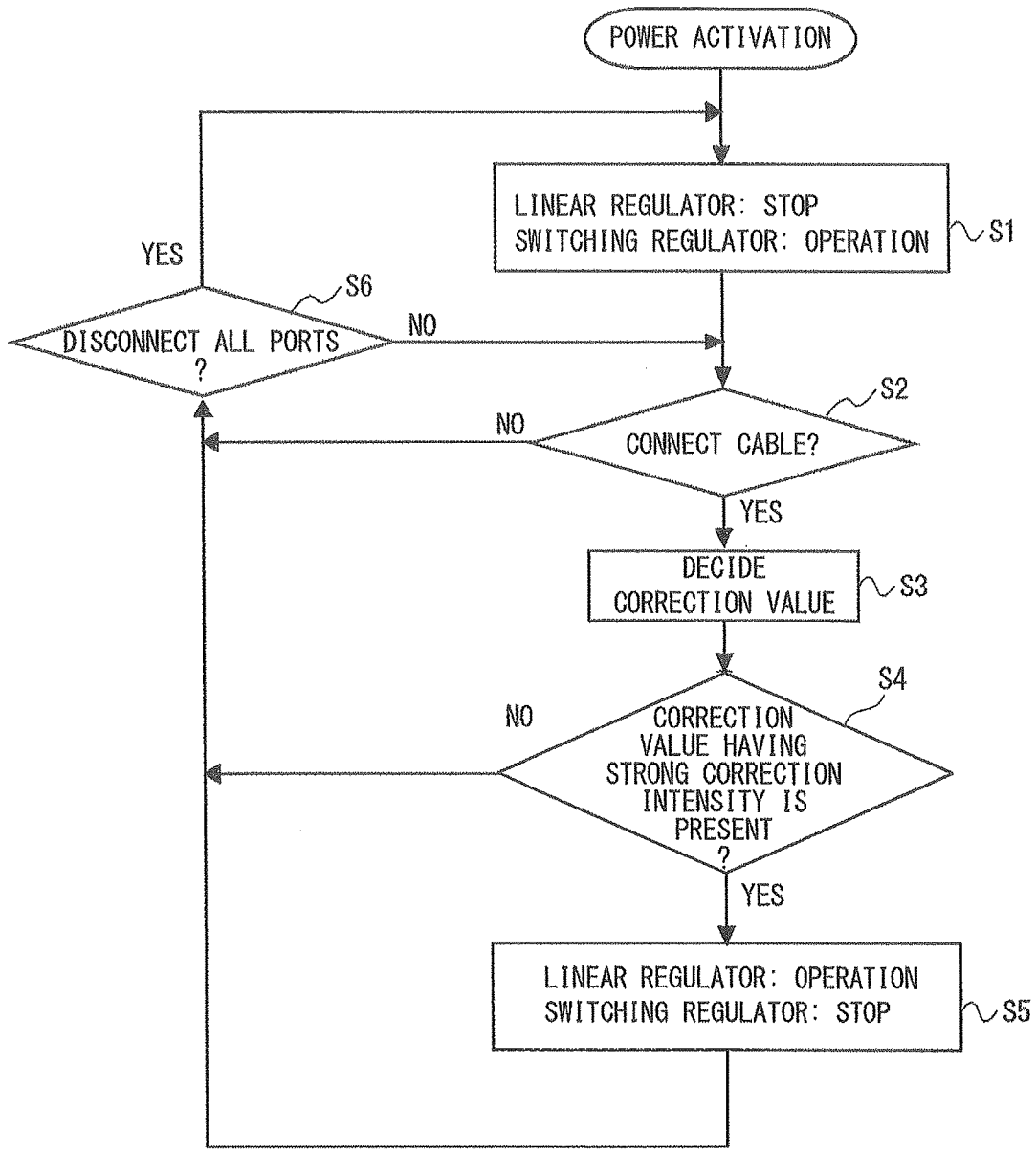
FIG. 3 is a timing chart showing operation of the serial data transmission line system pertaining to the embodiment 1.

Next, operation of the serial data transmission line system 1 pertaining to the embodiment 1 will be explained. FIG. 3 is a flow chart showing the operation of the serial data transmission line system 1 pertaining to the embodiment 1.

As shown in FIG. 3, in the serial data transmission line system 1, in response to power activation, the linear regulator 11 is stopped, and the switching regulator is made to operate (step S1). Subsequently, the serial data transmission line system 1 determines whether or not a cable is connected to the downstream ports DP1 to DPn and the upstream port UP (step S2).

If the serial data transmission line system 1 then determines that the cable is connected in step S2 (a YES branch of step S2), the equalizer circuit corresponding to the port to which the cable has been connected among the equalizer circuits of the data relay hub device 20 decides a correction value (step S3). The power supply management circuit 21 then verifies all correction values including a correction value updated by the correction value decided in step S3, and determines whether or not correction values not less than the threshold value are present (step S4). In FIG. 3, a correction intensity of the correction value not less than the threshold value is represented as "strong".

If then at least one correction value is present in which the correction intensity is determined to be strong based on the correction value in step S4 (a YES branch of step S4), the power supply management circuit 21 switches the power supply selection signal Ssw from the low level to the high level. Additionally, the serial data transmission line system 1 stops the switching regulator 12, makes the linear regulator 11 operate, connects the power supply selection switch circuit SW11 to the linear regulator 11 side, and thereby gives the step-down power supply LVOUT to the data relay hub device 20 as the operation power supply Vpwr (step S5). Additionally, after switching a supply source of the operation power supply in step S5, the serial data transmission line system 1 performs processing of step S6. In step S6, the serial data transmission line system 1 determines whether or not all the ports are in a state of being disconnected.

If it is determined in step S6 that at least any one port to which the cable has been connected is present (a NO branch of step S6), the serial data transmission line system 1 makes the linear regulator 11 operate, maintains a state where the switching regulator 12 is stopped, and returns to the processing of step S2. In addition, if it is determined in step S6 that all the ports are in the state of being disconnected (a YES branch of YES of step S6), the serial data transmission line system 1 carries out the processing of step S1, stops the linear regulator 11, and makes the switching regulator 11 operate.

Meanwhile, if it is determined in step S4 that the correction intensities of all the correction values are weak (a NO branch of step S4), the serial data transmission line system 1 performs the processing of step S6 without performing the switching processing of the regulator operation of step S5.

In the serial data transmission line system 1 pertaining to the embodiment 1, operation by the linear regulator 11 is continued until all the ports again become in the disconnection state, once the correction value having the strong correction intensity is set. This is because it is rare for the correction intensities of all the correction values to become weak, once the cable is connected and the strong correction intensity is set, and because a request to switch the regulator that is made to operate in response to switching of the correction intensity from strong to weak, is small.

From the above-described explanation, it is seen that when the correction intensity of the correction value of the equalizer circuit is strong, the serial data transmission line system 1 pertaining to the embodiment 1 supplies the operation power supply Vpwr provided to the data relay hub device 20 from the linear regulator 11. As a result, in the serial data transmission line system 1, a power supply having a low noise level is supplied to the data relay hub device 20 in a state of needing the correction value which has the strong correction intensity due to deterioration of signal quality of serial data, and thus communication quality can be improved.

In addition, the serial data transmission line system 1 pertaining to the embodiment 1 makes the linear regulator 11 operate only when the signal quality of the serial data is in a bad state. As a result, the serial data transmission line system 1 pertaining to the embodiment 1 operates by the switching regulator 12 having good power supply efficiency, when the signal quality of the serial data is good. That is, the serial data transmission line system 1 pertaining to the embodiment 1 can improve communication quality while reducing power consumption.

It is to be noted that in the explanation pertaining to the above-described embodiment 1, a control scheme has been explained in which the linear regulator 11 is set as the supply source of the operation power supply Vpwr when at least one correction value generated by the equalizer circuits 240 to 24n is determined to have the strong correction intensity. However, when an operation current of the data relay hub device 20 increases, it is also possible to supply the operation power supply Vpwr from the switching regulator 12 even when the correction value having the strong correction intensity is present in consideration of the power supply efficiency. In this case, for example, it can be considered that the power supply management circuit 21 determines a consumption current using the number of ports to which the cable has been connected or a current monitor circuit, etc.

Embodiment 2

Figure 4:
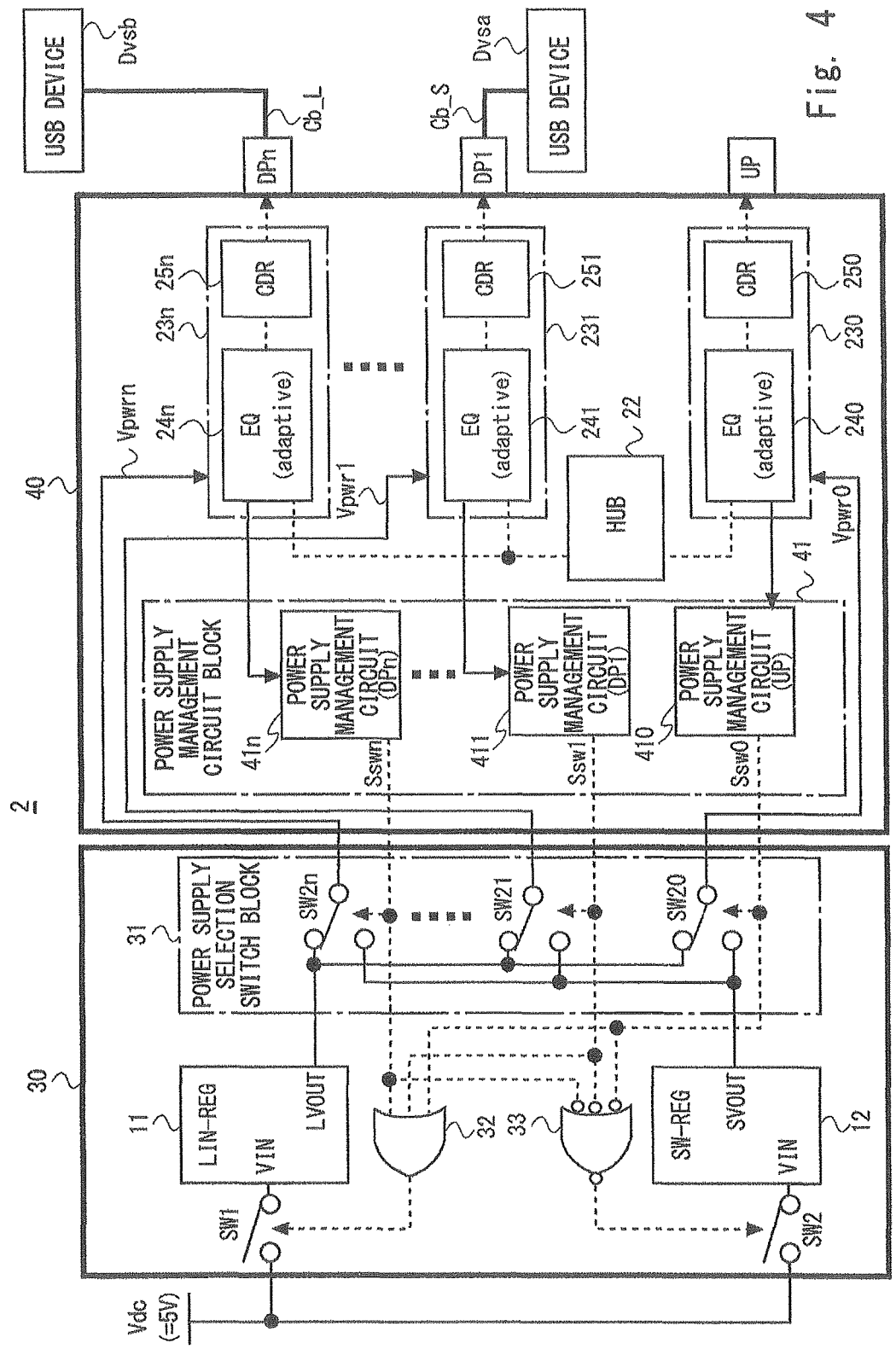
FIG. 4 is a block diagram of a serial data transmission line system pertaining to an embodiment 2.

In the embodiment 2, a serial data transmission line system 2 including a power supply generation circuit 30 and a data relay hub device 40 will be explained. FIG. 4 is a block diagram of a power supply generation circuit 30 and a data relay hub device 40, which are the different configurations of the power supply generation circuit 10 and the data relay hub device 20. It is to be noted that in the explanation of the embodiment 2, the same symbols as used in the embodiment 1 are attached to the same components as those explained in the embodiment 1, and thus that explanations thereof are omitted.

As shown in FIG. 4, the power supply generation circuit 30 has a power supply selection switch block 31 instead of the power supply selection switch circuit SW11 of the power supply generation circuit 10. The power supply selection switch block 31 has a plurality of power supply selection switch circuits (for example, power supply selection switch circuits SW20 to SW2n) provided so as to correspond to the reception blocks 230 to 23n. The power supply selection switch circuits SW20 to SW2n select either one of the step-down power supply LVOUT generated by the linear regulator 11 by means of a corresponding power supply selection signal of the power supply selection signals Ssw0 to Ssw1 output by the data relay hub device 40, and the step-down power supply SVOUT generated by the switching regulator 12. In addition, the power supply selection switch circuits SW20 to SW2n set the selected step-down power supply as an operation power supply to the corresponding reception block. For example, the power supply selection switch circuit SW20 provides the selected step-down power supply to the reception block 230 as an operation power supply Vpwr0.

In addition, the power supply generation circuit 30 has an OR circuit 32 and a NOR circuit 33. The OR circuit 32 controls the switch circuit SW1 by a logical sum operation result of the power supply selection signals Ssw0 to Sswn output by the data relay hub device 40. That is, in the embodiment 2, the switch circuit SW1 becomes in the on state if any one of the power supply selection signals Ssw0 to Sswn becomes the high level. The NOR circuit 33 controls the switch circuit SW2 by an inverted logical sum operation result of inverted values of the power supply selection signals Ssw0 to Sswn output by the data relay hub device 40. That is, in the embodiment 2, the switch circuit SW2 becomes in the on state if any one of the power supply selection signals Ssw0 to Sswn becomes the low level.

In addition, the data relay hub device 40, similarly to the data relay hub device 20, has a plurality of reception blocks (for example, the reception blocks 230 to 23n) each of which has a set of a clock data recovery circuit and an equalizer circuit. However, the data relay hub device 40 is different from the data relay hub device 20 in that, in the former device, a power supply is individually provided for each reception block.

Additionally, the data relay hub device 40 has a power supply management circuit block 41 instead of the power supply management circuit 21 of the data relay hub device 20. The power supply management circuit block 41 has a plurality of power supply management circuits (for example, power supply management circuits 410 to 41n) provided so as to correspond to the reception blocks 230 to 23n. The power supply management circuits 410 to 41n each receive a correction value from the corresponding equalizer circuit of the equalizer circuits 240 to 24n, and output the power supply selection signals Ssw0 to Sswn according to correction intensities of the received correction values. Additionally, the power supply selection switch circuits SW20 to SW2n switch which of the step-down power supplies SVOUT and LVOUT is provided as the operation power supplies Vpwr0 to Vpwrn for each plurality of reception blocks based on the power supply selection signals Ssw0 to Sswn output by the power supply management circuits 410 to 41n.

It is to be noted that although in the embodiment 2, a supply source of the operation power supply to the power supply management circuit block 41 and the hub 22 is not particularly illustrated, supply of the operation power supply supplied to these circuit blocks can be arbitrarily decided. As one example, the operation power supply Vpwr0 output by the power supply selection switch circuit SW20 can be provided to the power supply management circuit block 41 and the hub 22.

In addition, also in the embodiment 2, the equalizer circuits 240 to 24n respectively generate a correction value when a USB device is connected to the input terminals of the clock data recovery circuits 250 to 25n. Meanwhile, the equalizer circuits 240 to 24n each output a disconnection notice signal that notifies the corresponding power supply management circuits 410 to 41n that the USB device has been disconnected when the USB device is disconnected. The power supply management circuits 410 to 41n then respectively instruct the power supply selection switch circuits SW20 to SW2n to output the step-down power supplies SVOUT as the operation power supplies Vpwr0 to Vpwrn by the power supply selection signals Ssw0 to Sswn in response to the providing of the disconnection notice signal.

Next, operation of the serial data transmission line system 2 pertaining to the embodiment 2 will be explained. The serial data transmission line system 2 pertaining to the embodiment 2 has the above-described configuration, and thereby can switch the supply source of the operation power supply for each reception block. That is, in the serial data transmission line system 2 pertaining to the embodiment 2, whole operation in which switching operation of the supply source of the operation power supply with respect to one reception block has been withheld, is the operation. Consequently, in the embodiment 2, the switching operation of the supply source of the operation power supply with respect to one reception block will be explained.

Figure 5:
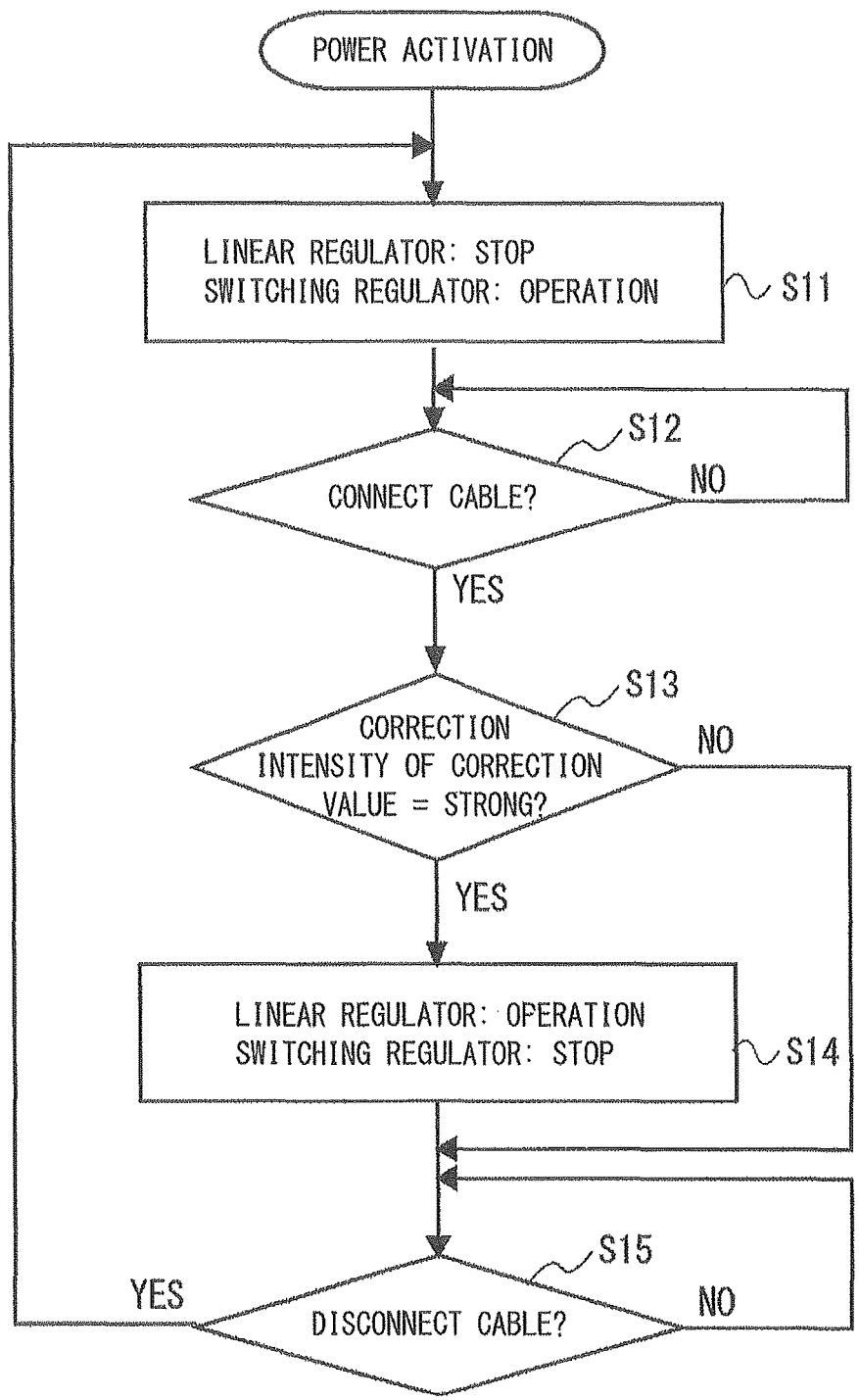
FIG. 5 is a timing chart showing operation of the serial data transmission line system pertaining to the embodiment 2.

FIG. 5 is a flow chart showing operation of the serial data transmission line system 2 pertaining to the embodiment 2. It is to be noted that in the flow chart of FIG. 5, an operation intended for a state where a cable has been connected to or disconnected from the equalizer circuit 24n will be explained. As shown in FIG. 5, in the serial data transmission line system 2, in response to power activation, the linear regulator 11 is stopped, and a switching regulator is made to operate (step S11). Subsequently, the serial data transmission line system 2 determines whether or not a cable has been connected to the downstream port DPn (step S12).

If the serial data transmission line system 2 then determines that the cable has been connected to the downstream port DPn in step S12 (a YES branch of step S12), the equalizer circuit 24n of the data relay hub device 40 decides on a correction value. The power supply management circuit 41n then determines whether or not a correction value not less than a threshold value is present (step S13). In FIG. 5, a correction intensity of the correction value not less than the threshold value is represented as "strong".

If the correction intensity is then determined to be strong based on the correction value decided on in step S13 (a YES branch of step S13), the power supply management circuit 41n switches the power supply selection signal Sswn from a low level to a high level. The serial data transmission line system 2 then puts the switching regulator 12 in a stop state with respect to the reception block 23n, puts the linear regulator 11 in an operation state, connects the power supply selection switch circuit SW2n to the linear regulator 11 side, and thereby provides the step-down power supply LVOUT to the reception block 23n as the operation power supply Vpwrn (step S14). It is to be noted that an operation power supply is provided from the switching regulator 12 to the other reception blocks to which cables are not connected. Additionally, after switching the supply source of the operation power supply in step S14, the serial data transmission line system 2 performs processing of step S15. In step S15, it is determined whether or not the cable connected to the port has been disconnected.

If it is determined in step S15 that the state where the cable has been connected to the port is maintained (a NO branch of step S15), the serial data transmission line system 2 maintains a current state. In addition, if it is determined in step S15 that the cable which has been connected to the port is in a state where it has been disconnected from the port (a YES branch of YES of step S15), the serial data transmission line system 2 carries out processing of step S11, stops the linear regulator 11, and makes the switching regulator 11 operate.

Meanwhile, if it is determined in step S13 that the correction intensity of the correction value is weak (a NO branch of step S13), the serial data transmission line system 2 performs processing of step S15 without performing switching processing of a regulator operation of step S14.

From the above-described explanation, it is seen that in the serial data transmission line system 2 pertaining to the embodiment 2, the supply source of the operation power supply according to the correction intensity of the correction value is decided for each reception block. As a result, the serial data transmission line system 2 pertaining to the embodiment 2 can increase a utilization ratio of the switching regulator 12 more than in the serial data transmission line system 1 pertaining to the embodiment 1, to thereby reduce power consumption of the system. In addition, in the serial data transmission line system 2, supply of the operation power supply is appropriately performed by the linear regulator 11 while increasing the utilization ratio of the switching regulator 12, and thereby communication quality can be enhanced.

Embodiment 3

In an embodiment 3, a serial data transmission line system 3 shown in FIG. 6 will be explained. It is to be noted that in the explanation of the embodiment 3, the same symbols as used in the embodiments 1 and 2 are attached to the same components as are explained in the embodiments 1 and 2, and thus that explanations thereof are omitted.

Figure 6:
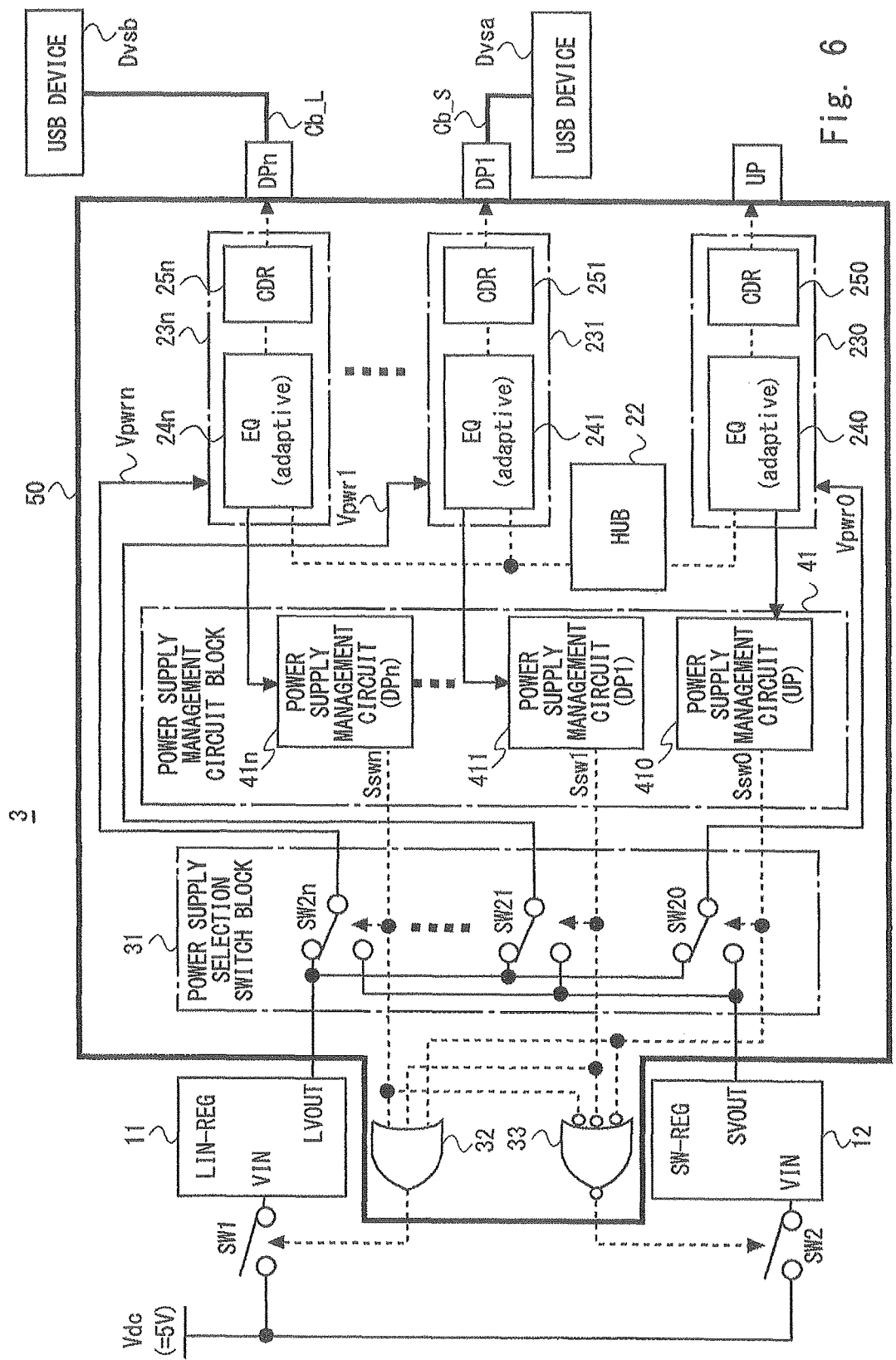
FIG. 6 is a block diagram of a serial data transmission line system pertaining to an embodiment 3.

As shown in FIG. 6, the serial data transmission line system 3 pertaining to the embodiment 3 has a data relay hub device 50 instead of the data relay hub device 40. The data relay hub device 50 is a device in which the power supply selection switch block 31, the OR circuit 32, and the NOR circuit 33 that are provided in the power supply generation circuit 30 have been incorporated in the data relay hub device 40. That is, in the serial data transmission line system 3 pertaining to the embodiment 3, on one semiconductor substrate, the power supply management circuit block 41, the hub 22, the reception blocks 230 to 23n, the power supply selection switch block 31, the OR circuit 32, and the NOR circuit 33 are formed.

In addition, the serial data transmission line system 3 pertaining to the embodiment 3 has a first power supply terminal to which the data relay hub device 50 inputs a first power supply (step-down power supply SVOUT), and a second power supply terminal to which the data relay hub device 50 inputs a second power supply (step-down power supply LVOUT) whose noise level is smaller than that of the step-down power supply SVOUT. In addition, the serial data transmission line system 3 pertaining to the embodiment 3 has a first selection signal output terminal to output a power supply selection signal that controls an on/off state of the switch circuit SW1, and a second selection signal output terminal to output a power supply selection signal that controls an on/off state of the switch circuit SW2.

In addition, as shown in FIG. 6, in the serial data transmission line system 3 pertaining to the embodiment 3, the linear regulator 11 and the switching regulator 12 are provided as individual parts.

From the above-described explanation, it is seen that the serial data transmission line system 3 pertaining to the embodiment 3 has the data relay hub device 50. The data relay hub device 50 is equivalent to the data relay hub device 40 in which the power supply selection switch block 31, the OR circuit 32, and the NOR circuit 33 have been incorporated. That is, in the serial data transmission line system 3, the linear regulator 11 and the switching regulator 12 are provided in the data relay hub device 50, the first power supply and the second power supply are provided in the data relay hub device 50, which is the only way the system can be configured. As a result, in the serial data transmission line system 3, mistakes in substrate design can be reduced. In addition, in the serial data transmission line system 3, the number of the individually mounted parts decrease, and thus a mounting area can be reduced. Meanwhile, in the serial data transmission line system 3, the linear regulator 11 and the switching regulator 12 are provided outside, and thereby heat treatment concerning a power supply circuit can be easily performed.

Embodiment 4

In an embodiment 4, a serial data transmission line system 4 shown in FIG. 7 will be explained. It is to be noted that in the explanation of the embodiment 4, the same symbols as used in the embodiments 1 and 2 are attached to the same components as are explained in the embodiments 1 and 2, and thus that explanations thereof are omitted.

Figure 7:
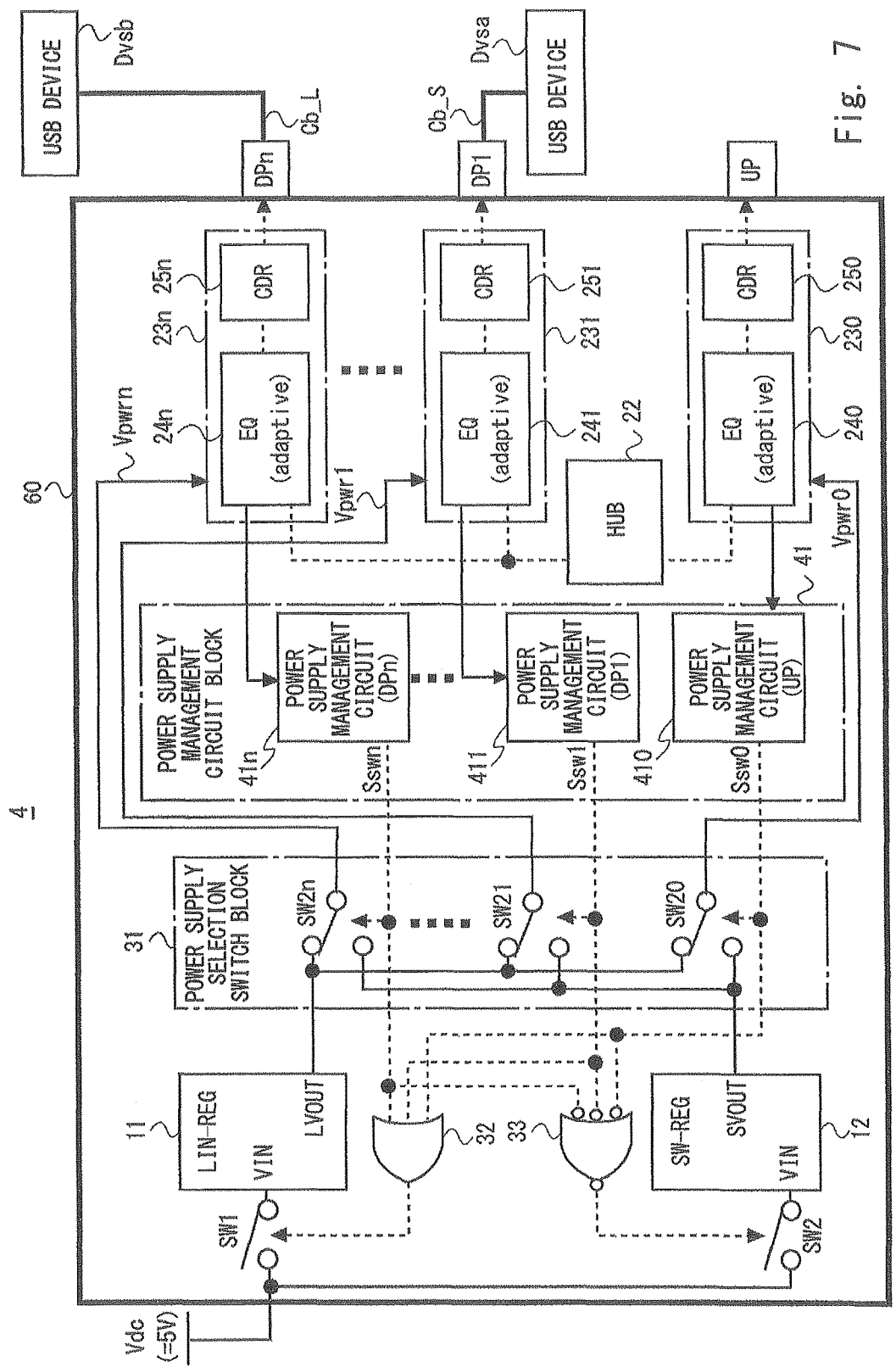
FIG. 7 is a block diagram of a serial data transmission line system pertaining to an embodiment 4.

As shown in FIG. 7, the serial data transmission line system 4 pertaining to the embodiment 4 has a data relay hub device 60 instead of the data relay hub device 40. The data relay hub device 60 is a device in which the power supply selection switch block 31, the OR circuit 32, the NOR circuit 33, the linear regulator 11, and the switching regulator 12 that are provided as the power supply generation circuit 30 have been incorporated in the data relay hub device 40. That is, in the serial data transmission line system 4 pertaining to the embodiment 4, on one semiconductor substrate, the power supply management circuit block 41, the hub 22, the reception blocks 230 to 23n, the power supply selection switch block 31, the OR circuit 32, the NOR circuit 33, the linear regulator 11, and the switching regulator 12 are formed. In addition, in the serial data transmission line system 4 pertaining to the embodiment 4, the data relay hub device 60 has a power supply terminal to which the external power supply Vdc is input.

From the above-described explanation, it is seen that the serial data transmission line system 4 pertaining to the embodiment 4 has the data relay hub device 60 in which functional blocks of the power supply generation circuit 30 have been incorporated in the data relay hub device 40. That is, in the serial data transmission line system 4, the external power supply Vdc is connected to the data relay hub device 60, which is the only way that the system can be configured. As a result, in the serial data transmission line system 4, mistakes in substrate design can be reduced. In addition, in the serial data transmission line system 4, the number of individually mounted parts decrease, and thus a mounting area can be reduced.

Hereinbefore, although the invention made by the present inventor has been specifically explained based on the embodiments, the present invention is not limited to the already mentioned embodiments, and it is needless to say that various changes can be made without departing from the scope of the invention.

The above-described embodiments can be combined as appropriate or desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
a reception circuit that operates based on an operation power supply, and reproduces a clock signal from serial data;
an equalizer circuit that operates based on the operation power supply, calculates a correction value according to a distortion amount of serial data received by the reception circuit, reproduces reception data based on the correction value; and
a power supply management circuit that outputs a power supply selection signal according to the correction value, and receives one of a first power supply and a second power supply based on the power supply selection signal as the operation power supply,
wherein the second power supply has a noise level smaller than that of the first power supply.

2. The semiconductor device according to claim 1, wherein the power supply management circuit instructs a power supply generation circuit to output and receives one of the first power supply and the second power supply based on the power supply selection signal, when the correction value is not less than a preset threshold value, the power supply generation circuit provides the second power supply as the operation power supply.

3. The semiconductor device according to claim 2, further comprising a plurality of reception blocks each of which has a set of the reception circuit and the equalizer circuit, wherein
the equalizer circuits included in the plurality of reception blocks respectively generate the correction value when an other device is connected to an input terminal of the corresponding reception circuit, and respectively output a disconnection notice signal that notifies the power supply management circuit that the other device has been disconnected when the other device is disconnected, and
the power supply management circuit determines presence/absence of the reception block in which the correction value is not less than the preset threshold value in response to the transmitting of the disconnection notice signal, and if it is determined that the reception block in which the correction value is not less than the preset threshold value is not present, the power supply management circuit instructs the power supply generation circuit to output the first power supply as the operation power supply by the power supply selection signal.

4. The semiconductor device according to claim 1, further comprising:
a plurality of reception blocks each of which has a set of the reception circuit and the equalizer circuit; and
a plurality of the power supply management circuits provided so as to correspond to the plurality of reception blocks,
wherein the power supply generation circuit switches which of the first power supply and the second power supply is provided as the operation power supply for each of the plurality of reception blocks based on a plurality of the power supply selection signals output by the plurality of the power supply management circuits.

5. The semiconductor device according to claim 4, wherein
the equalizer circuits included in the plurality of reception blocks respectively generate the correction value when an other device is connected to an input terminal of the reception circuit, and respectively output a disconnection notice signal that notifies a corresponding power supply management circuit that the other device has been disconnected when the other device is disconnected, and
a plurality of the power supply management circuits respectively instruct the power supply generation circuit to output the first power supply as the operation power supply by the power supply selection signal in response to the transmitting of disconnection notice signal having.

6. The semiconductor device according to claim 1, further comprising a power supply generation circuit which includes:
a first power supply circuit that generates the first power supply based on an external power supply provided from outside;
a second power supply circuit that generates the second power supply based on the external power supply; and
at least one power supply selection switch circuit that selects either one of the first power supply and the second power supply based on the power supply selection signal, and outputs the selected power supply as the operation power supply.

7. The semiconductor device according to claim 6, wherein
the first power supply circuit comprises a switching regulator, and
the second power supply circuit comprises a linear regulator.

8. The semiconductor device according to claim 6, wherein the power supply selection switch circuit is formed on one semiconductor substrate together with the reception circuit, the equalizer circuit, and the power supply management circuit.

9. The semiconductor device according to claim 8, wherein the first power supply circuit and the second power supply circuit are formed on one semiconductor substrate together with the reception circuit, the equalizer circuit, and the power supply management circuit.

10. A serial data transmission line system comprising:
a first power supply circuit that generates a first power supply based on an external power supply provided from outside;
a second power supply circuit that generates a second power supply whose noise level is lower than that of the first power supply based on the external power supply;
a reception circuit that operates based on an operation power supply, and reproduces a clock signal from serial data;
an equalizer circuit that operates based on the operation power supply, calculates a correction value according to a distortion amount of serial data received by the reception circuit, corrects distortion of the serial data according to the correction value, and reproduces reception data;
a power supply management circuit that outputs a power supply selection signal according to the correction value; and
a power supply selection switch circuit that selects either one of the first power supply and the second power supply based on the power supply selection signal, and outputs the selected power supply as the operation power supply.

11. The serial data transmission line system according to claim 10, wherein the power supply management circuit instructs the power supply selection switch circuit to select the second power supply based on the power supply selection signal, when the correction value is not less than a preset threshold value.

12. The serial data transmission line system according to claim 11, further comprising a plurality of reception blocks each of which has a set of the reception circuit and the equalizer circuit, wherein
the equalizer circuits included in the plurality of reception blocks respectively generate the correction value when an other device is connected to an input terminal of the corresponding reception circuit, and respectively output a disconnection notice signal that notifies the power supply management circuit that the other device has been disconnected when the other device is disconnected, and
the power supply management circuit determines presence/absence of the reception block in which the correction value is not less than the threshold value in response to the disconnection notice signal having been transmitted, and if it is determined that the reception block in which the correction value is not less than the threshold value is not present, the power supply management circuit instructs the power supply selection switch circuit to output the first power supply as the operation power supply by the power supply selection signal.

13. The serial data transmission line system according to claim 10, further comprising:
a plurality of reception blocks each of which has a set of the reception circuit and the equalizer circuit;
a plurality of the power supply management circuits provided so as to correspond to the plurality of reception blocks; and
a plurality of the power supply selection switch circuits provided so as to correspond to the plurality of reception blocks,
wherein the plurality of power supply selection switch circuits switch which of the first power supply and the second power supply is provided as the operation power supply for each of the plurality of reception blocks based on a plurality of the power supply selection signals output by the plurality of the power supply management circuits.

14. The serial data transmission line system according to claim 13, wherein
the equalizer circuits included in the plurality of reception blocks respectively generate the correction value when an other device is connected to an input terminal of the reception circuit, and respectively output a disconnection notice signal that notifies a corresponding power supply management circuit that the other device has been disconnected when the other device is disconnected, and
the plurality of the power supply management circuits respectively instruct the plurality of the power supply selection switch circuits to output the first power supply as the operation power supply by the power supply selection signal in response to the disconnection notice signal having been transmitted.

15. The serial data transmission line system according to claim 10, wherein at least the reception circuit, the equalizer circuit, and the power supply management circuit are formed on one semiconductor substrate.

16. The serial data transmission line system according to claim 10, wherein
the first power supply circuit comprises a switching regulator, and
the second power supply circuit comprises a linear regulator.

* * * * *